Dec. 25, 1956   J. W. CHEPIL ET AL   2,775,065
APPARATUS FOR EFFECTING THE FECUNDATION OF PLANTS
Filed Sept. 9, 1955   2 Sheets-Sheet 1

INVENTORS
WILLIAM S. CHEPIL
BY & JOHN W. CHEPIL
McMorrow, Berman & Davidson
ATTORNEYS Dec. 25, 1956  J. W. CHEPIL ET AL  2,775,065
APPARATUS FOR EFFECTING THE FECUNDATION OF PLANTS
Filed Sept. 9, 1955  2 Sheets-Sheet 2

INVENTORS
WILLIAM S. CHEPIL
& JOHN W. CHEPIL
BY
McMorrow, Berman & Davidson
ATTORNEYS

United States Patent Office 2,775,065
Patented Dec. 25, 1956

2,775,065
APPARATUS FOR EFFECTING THE FECUNDATION OF PLANTS

John W. Chepil and William S. Chepil, Manhattan, Kans.

Application September 9, 1955, Serial No. 533,488

4 Claims. (Cl. 47—1)

This invention relates to apparatus for effecting the fecundation of plants, the apparatus being of the mobile machine type for tripping blooms, and more particularly to means used in connection with this apparatus for collecting pollen from the tripped blooms and distributing the collected pollen.

It is the principal object of this invention to provide a mobile machine for tripping the blooms of plants, for the fecundation of the blooms, and improvement for collecting the pollen from the tripped blooms and distributing the pollen thus collected to the blooms of other plants over which the machine travels.

It is a further object of this invention to provide in a machine of the type indicated, surface areas having distinct absorptive, electrostatic properties so as to be able in varying degrees to attract, absorb and hold large quantities of pollen on and among the filaments of the filamentous material along the surface areas but with the pollen grains therein not being held so tightly that they cannot become detached from the filaments by the shaking, beating and rubbing action of the vanes upon which the surface areas are mounted and assisted in becoming detached from the surface areas by rubbing action of a rotary brush. Thus, the filaments on the surface areas serve as a reservoir of pollen picked up from the tripped plants and also serve as a carrier, dispenser and distributing means of the pollen collected onto other plants, similar to the manner in which pollen is picked up, carried and deposited on different plants by the hairy bodies of tripping and cross-pollinating insects, such as bees.

Yet another object of this invention is to provide a machine of the type indicated, a collecting and distributing means for pollen of plants tripped by the machine, which means is effective to treat a large area of growing plants in a short time.

Other objects and advantages will become apparent from a consideration of the following detailed description forming the specification, and taken in conjunction with the accompanying drawings, in which:

Figure 3 is a fragmentary cross-sectional view taken substantially along line 3—3 of Figure 1 and looking in the direction of the arrows.

Figure 1:
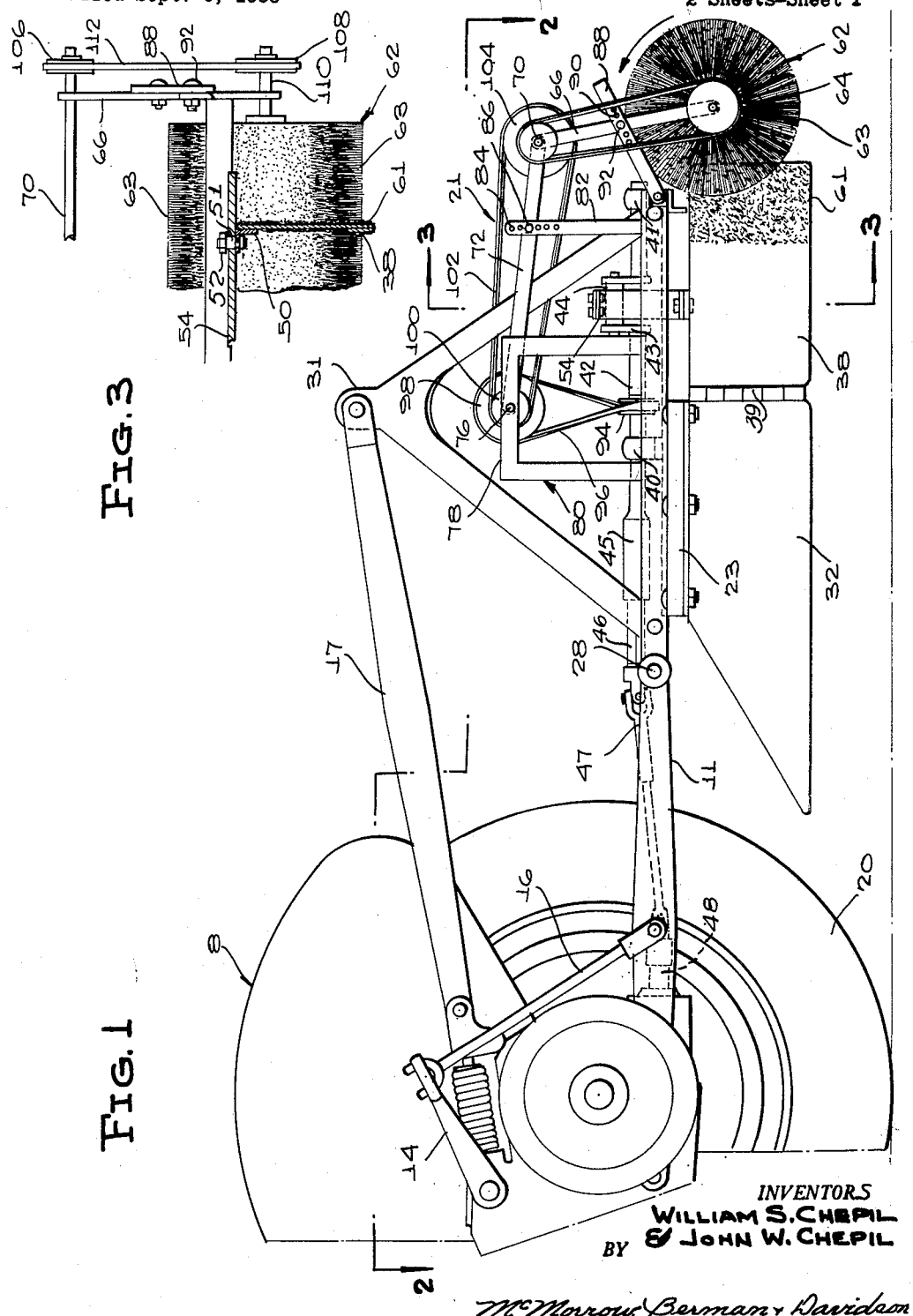
Figure 1 is a side elevational view of a plant treating machine with the improvement of this invention employed in connection therewith, with the rear portion of a prime mover fragmentarily shown.

With continued reference to the drawings, a prime mover, generally indicated at 8, is shown as an agricultural tractor having a lift and depth control mechanism which includes links 10 and 11 extending rearwardly from the rear axle 12 of the tractor and raised and lowered by means of lift arms 13 and 14 connected at their distal ends to the tension links 10 and 11 intermediate the length of these links by connecting rods 15 and 16, and a compression link 17 disposed between and above the tension links 10 and 11 and connected at its forward end to a valve mechanism 18 which controls the hydraulic mechanism connected to the lift arms 13 and 14 in a manner well known to the art. The forward movement of the compression link 17 is resisted by a compression spring in the usual manner, interposed between the front end of the link 17 and abutment fixed on the top portion of the tractor rear axle 12.

The rear axle 12 of the tractor supported on rear drive wheels 20, as is common in the prime mover tractor of the agricultural type well known to the art, in more detailed illustration description of the tractor is considered unnecessary for the purposes of the present disclosure.

Figure 2:
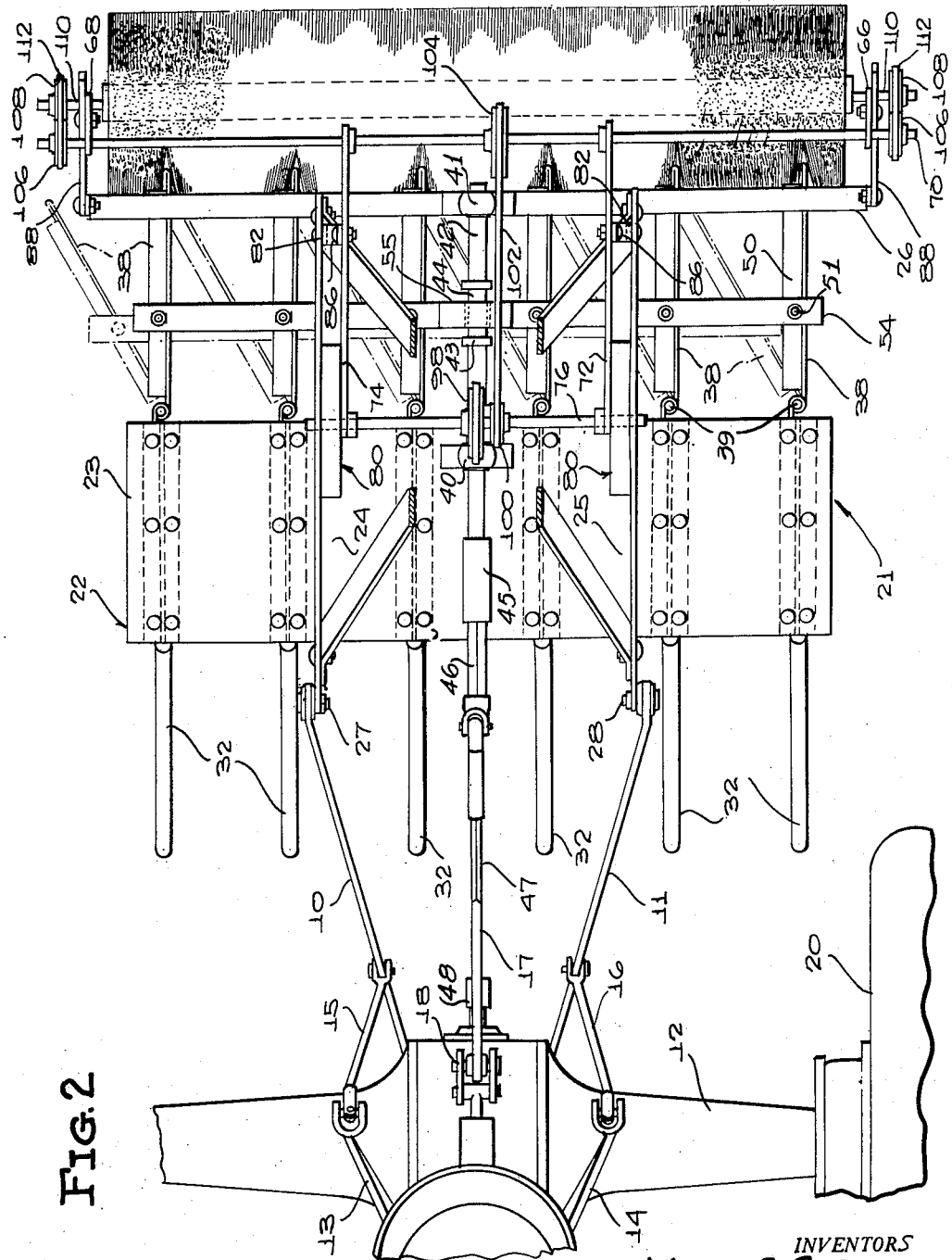
Figure 2 is a view in top plan, partially in section, taken substantially along line 2—2 of Figure 1, and looking in the direction of the arrows.

The plant treating machine, generally indicated at 21, is that of Patent No. 2,749,664 and comprises a frame, generally indicated in Figure 2 at 22, which includes a flat plate 23 of elongated rectangular shape, angle bars 24 and 25 extending transversely across the plate 23 and beyond the opposite side edges thereof in spaced parallel relation to each other and at substantially equal distances from the mid-length location of the plate, and an angle frame bar 26 connected to the rear ends of the bars 24 and 25 and disposed in spaced, parallel relationship to the rear edge of the plate 23. The opposite or front ends of the bars 24 and 25 are provided with typical connectors 27 and 28, by means of which the rear ends of the tension links 10 and 11 of the tractor are pivotally connected to the front ends of these frame bars, as clearly shown in Figures 1 and 2. The frame bars 24 and 25 carry thereon an upstanding support of pyramidal shape having four legs diverging downwardly and outwardly from a centrally located lug 31 to which the rear end of the tractor compression link 17 is pivotally connected with the implement lift and depth controlling mechanisms of the tractor thus being effective to maintain the machine frame 22 in a substantially horizontal position in a predetermined distance above the surface of the ground on which the wheels of the tractor rest.

A plurality of separator plates 32 are secured along upper edges to the frame plate 23 and depend therefrom in substantially uniformly spaced apart planes which are perpendicular to the side edges and face surfaces of the frame plate with the separator plates extending parallel to the longitudinal axis of the tractor and extending beyond the frame plate 23 at opposite sides thereof.

The width of the separator plates 32 is such that, with the frame plate 23 disposed slightly above the tops of growing plants, the bottom edges of the separator plates will be disposed near the ground and somewhat below the bloom carrying portions of the plants.

Vanes 38 of rectangular shape are vertically disposed, one adjacent the rear end of each of the separator plates 32, and each vane 38 is connected along its front edge to the rear edge of the associated separator plate for swinging movement about a vertical axis as by a hinge formation 39 having an axis perpendicular to the plane of the machine frame 22. These vanes extend from the rear ends of the separator plates 32 substantially to the rear crossbar 26 of the frame and are swingable about their hinge connections with the rear ends of the associated separator plates to apply a beating action to growing plants passing between the separator plates as the machine is pulled across a field of growing plants.

A journal pillow block 40 is mounted on the top of the frame plate 23 at the mid-length location of this plate and near the rear side edge thereof and a similar pillow journal block 41 is mounted on the rear frame bar 26 at the mid-length location of this frame bar. A crankshaft 42 extends through and is journaled in the journal blocks 40 and 41 and is provided between the blocks 40 and 41 with a crank 43 having a cylindrical roller 44 on its crank pin. The crankshaft 42 extends forwardly of the front journal bearing or block 40 and is provided at its front end with an elongated socket structure 45 which receives the rear portion 46 of a drive shaft 47, the front end of which is connected to the tractor power take-off connection 48, so that the crankshaft is driven by the power take-off connection of the associated tractor.

An angle iron rib 50 extends along the top edge of each of the vanes 38 and is rigidly secured to the corresponding vane and a pin 51 extends upwardly from each rib 50 and is provided at its upper end with a screw threaded portion receiving a nut 52. The pins 51 are all located at equal distances from the axes of the corresponding hinge formations 39 and a flat actuating bar 54 extends across the top edges of the vanes 38 and is provided with apertures spaced apart longitudinally thereof which receive the pins 51. When the bar 54 is reciprocated, the vanes 38 will be swung back and forth or oscillated about their hinge formations with the corresponding separator plates 32.

A hollow bracket 55 of elongated, rectangular shape, is secured on the bar 54 at the mid-length location of the bar and extends upwardly from the actuator bar. The bearing sleeve or roller 44 on the crank pin of the crankshaft 42 is disposed in the bracket 55 and, as the crankshaft is rotated, the crank pin of the crankshaft imparts reciprocating movement to the actuator bar 54 through the intermediacy of the bracket 55. This invention is an improvement in the above described plant treating machine 21, as disclosed in Patent No. 2,749,664 and consists of a blanket of soft, filamentous material 61 secured by a suitable adhesive to opposite vertical faces of each of the vanes 38 and extending from the pair of vertical edges of each of the vanes, remote from the corresponding separator plate 32 carrying the vane, and extending forwardly toward the associated separator plate, is a cylindrical brush generally indicated at 62, having thin, flexible bristles, such as Nylon bristles, fastened to and extending radially from the central cylinder 64, the bristles being indicated at 63. The cylindrical brush 62 is mounted on the frame 22 for counter-clockwise rotation about an axis transversely of the frame adjacent the end of the vanes remote from said separator plates, as indicated by the arrow in Figure 1, so that the bristles thereon will engage and scrape across the filamentous surfaces 61 on the vanes. Also, vanes are provided for drivingly connecting the vane-driving means with the brush so as to impart rotary movement to the brush.

For additional effectiveness of cross-pollination, the bristles 63 are covered with soft-filamentous matter, such as flock, cemented at one of their extremities to the surfaces of the bristles.

The cylinder of the brush 62 is rotatably supported adjacent opposite ends in support arms 66 and 68 adjacent the lower ends of the arms, with the other ends of the arms depending from opposite ends of a shaft 70 rotatably supported adjacent opposite ends at the ends of support plates 72 and 74. The opposite ends of the support plates 72 and 74 are pivotally mounted on a shaft 76 parallel to the shaft 70 and disposed forwardly thereof and above the frame plate 23. The shaft 76 is supported adjacent its opposite ends centrally of the bight portion 78 of upstanding, inverted U-shaped brackets, generally indicated at 80, and upstandingly secured to the respective frame bars 24 and 25 centrally intermediate the ends thereof.

In order to support the plates 72 and 74 at the desired height above the frame plate 23, and consequently the brush 62 at a selected height above the ground surface to contact the vanes 38 at a selected position with respect to the height thereof, there is provided a pair of upstanding posts 82 secured at their lower ends upon the respective frame bars 24 and 25 adjacent the rear ends thereof, with the posts 82 being provided with a vertical row of spaced openings transversely therethrough, as indicated at 84, for the reception therethrough of a bolt 86 which passes through a suitably formed aperture of the respective support plates 72 and 74 so that the support plates can be secured in a selected one of the openings 84 and thereby adjust the height of the support arms above the frame plates and frame bars.

Means are also provided for selectively adjusting the angular inclination of the depending support arms 66 and 68 so that the desired degree of contact between the bristles 63 of the brush and the filamentous surfaces 61 on the respective vanes 38 can be accomplished. This means comprises a pair of bracket arms 88 pivotally secured at one end to opposite ends of the frame bar 26 so that they are mounted for movement in a vertical arcuate path, the path of the bracket arms being parallel to each other. Each of the bracket arms 88 is provided with a row of longitudinally spaced openings 90 transversely therethrough for the reception of a bolt 92 through a selected one of the openings and through a suitably formed registering opening in the respective ones of the support arms 66 and 68, so that the angular inclination of the support arms 66 and 68 may be selectively adjusted by the insertion of the bolt 92 through a selected one of the openings 90 and thereafter secured by the usual nut received on the threaded end of the shank of the bolt, in the usual manner.

In order to impart rotation to the brush 62, there is provided means drivingly connecting the brush to the drive shaft 47 and crank shaft 42 which imparts oscillatory movement to the vanes 38. The motion transmission means just referred to, comprises a pulley wheel 94 fixedly secured upon the crank shaft 42 for rotation therewith, a pulley belt 96 trained about the wheel 94 and about a larger pulley wheel 98 carried on the shaft 76 centrally intermediate the ends thereof to have rotation imparted thereto and to a smaller pulley wheel 100 connected thereto to one side thereof and rotatably mounted on the shaft 76. The drive belt 102 is trained about the pulley wheel 100 and about a larger pulley wheel 104 fixedly mounted on the shaft 70 so that rotation is imparted to the shaft 70 through the pulley wheel 104 by virtue of its belt-driven connection with the wheel 100. Mounted adjacent opposite ends of the shaft 70 are pulley wheels 106 for rotation with the shaft 70 and drivingly connected to respective pulley wheels 108 mounted on shaft extensions 110 at opposite ends of the brush cylinder 64 and extending longitudinally outwardly therefrom, by means of a driving belt connection 112 to thus impart rotation to the brush cylinder 64 and to the brush 62, and consequently to the bristles 63 extending radially outwardly from the cylinder 64 and extending across the vanes 38, as shown in Figure 2.

As the plant treating machine 21 traverses a field of growing plants, the oscillating vanes 38 beat and rub against the plants and blooms and against the portion of bristles 63 and the filaments carried by the bristles. The covering of filamentous material on the vanes 38 will bring the blooms tripped by the oscillatory action of the vanes 38 into more contact with the soft filaments of the material 61 attached to the vanes and to the bristles 63 of the brush to thereby effect a greater degree of cross-pollination of plants than was hitherto possible without the coaction of the bristles and filamentous materials.

The filamentous material 61 on the vanes 38 may be a fabric having a raised pile on one face thereof, which pile may be hairy, wooly, or velvet material which might include natural or artificial fibers, such as mohair, fur, suede, velvet or flannel and a smooth, or unnapped side of the fabric or material 61 secured to the vanes 38 by use of a suitable adhesive so that the filamentous surface thereof is exposed.

Due to the light surface area offered and distinct absorptive, adsorptive and electrostatic properties, the element of the filamentous material 61 and the filamentous material on the bristles 63 are able in varying degrees to attract, absorb and hold larger quantities of pollen on and among the filaments. But, the pollen grains are not held so tightly as to prevent their being detached from the filaments by the shaking, beating and rubbing action of the vanes 38 and by the rubbing and scraping action of the brush 62. Thus, the filaments serve the reservoir of pollen picked up from different plants, and they also serve as a carrier and distributor of pollen among and onto other plants.

It will be understood that the beating, shaking and rubbing action of the vanes 38 and the rubbing or scraping action of the brush 62, both having filaments, does two things: it trips the blooms and spreads pollen over the blooms in much the manner as of a powder puff moved against and over an object will spread powder over the object. An engagement of the filamentous surfaces of the vanes and brushes accomplishes the tripping and distributing action substantially simultaneously so that as the machine traverses a field of growing plants, considerable amounts of pollen are spread upon the blooms before or at the instant the blooms are tripped.

In use, cross-pollination by employment of the filamentous covered vanes 38 and the brush 62, and also having filaments thereon, is facilitated by tripping the bloom by action of the vanes 38 so that a comparatively sticky stigma breaks through a sac at the bottom of the standard petal of the bloom, swings toward the upper part of the standard petal, rubs against the soft filaments of the filamentous material 61 on the vanes and picks up some foreign pollen, that is, pollen from another plant, carried on the filaments; the stigma, as it swings toward the upper part of the standard petal of the bloom that has just been tripped, picks up some foreign pollen distributed and dispersed in the air by the action of the vanes 38 and the brushing action thereagainst of the brushes 62; and the stigma, as it finally comes to rest snugly against the upper part of the standard petal of the tripped bloom, picks up some foreign pollen deposited on the standard petal by the already described action of the filamentous material 61 on the vanes and the filaments carried by the bristles of the brush 62.

It is to be understood that the mobile machine 21 may be mounted in front of a tractor, jeep or any other prime mover, instead of in the rear as shown and above described, without departing from the spirit and essential characteristics of the invention. In these latter cases the machine may be mounted in a manner similar to that of a well known bulldozer or a loader, and receiving the required rotational motion from the power take-off of the prime mover in a manner like that of a well known cutter bar hay mowing attachment.

While there is shown and described the preferred embodiment of the invention, it is to be understood that the structure is susceptible to change and modification within the practicability of the invention and therefore should be limited only by the scope of the claims appended hereto.

What is claimed is:

1. In a machine for tripping blooms on growing plants comprising a frame adapted to be carried by an associated prime mover, separator plates secured to and depending from said frame and disposed substantially in planes which are uniformly spaced apart and parallel to each other and perpendicular to the plane of said frame, each of said plates having a substantially vertically disposed rear edge, vanes hingedly connected at their front ends to the rear edges of said separator plates and extending rearwardly one from each separator plate, power operated means mounted on said frame and drivingly connected to said vanes to impart to said vanes oscillating movements about the axes of the hinge connections between said vanes and the corresponding separator plates; the improvement residing in means for collecting and dispersing pollen from the tripped blooms, said means comprising a material having a filamentous surface carried by the outer surfaces of said vanes with the filamentous surfaces exposed, a brush having bristles extending radially therefrom mounted on said frame for rotation about an axis extending transversely of said separator plates adjacent the ends of the vanes remote from said separator plates to engage and brush across said filamentous surfaces on said vanes, and means drivingly connected between said vane driving means and said brush to impart rotary movement to the brush.

2. In a machine for tripping blooms on growing plants comprising a frame adapted to be carried by an associated prime mover, separator plates secured to and depending from said frame and disposed substantially in planes which are uniformly spaced apart and parallel to each other and perpendicular to the plane of said frame, each of said plates having a substantially vertically disposed rear edge, vanes hingedly connected at their front ends to the rear edges of said separator plates and extending rearwardly one from each separator plate, power operated means mounted on said frame and drivingly connected to said vanes to impart to said vanes oscillating movements about the axes of the hinge connections between said vanes and the corresponding separator plates; the improvement residing in means for collecting and dispersing pollen from the tripped blooms, said means comprising a material having a filamentous surface carried by the outer surfaces of said vanes with the filamentous surfaces exposed, a brush having bristles extending radially therefrom mounted on said frame for rotation about an axis extending transversely of said separator plates adjacent the ends of the vanes remote from said separator plates to engage and brush across said filamentous surfaces on said vanes, and means drivingly connected between said vane driving means and said brush to impart rotary movement to the brush, and means carried by said frame at the end thereof remote from the associated prime mover for movement in parallel arcuate paths at opposite sides of the frame and operatively connected to said brush to selectively move the brush toward and away from said vanes.

3. In a machine for tripping blooms on growing plants comprising a frame adapted to be carried by an associated prime mover, separator plates secured to and depending from said frame and disposed substantially in planes which are uniformly spaced apart and parallel to each other and perpendicular to the plane of said frame, each of said plates having a substantially vertically disposed rear edge, vanes hingedly connected at their front ends to the rear edges of said separator plates and extending rearwardly one from each separator plate, power operated means mounted on said frame and drivingly connected to said vanes to impart to said vanes oscillating movements about the axes of the hinge connections between said vanes and the corresponding separator plates; the improvement residing in means for collecting and dispersing pollen from the tripped blooms, said means comprising a material having a filamentous surface carried by the outer surfaces of said vanes with the filamentous surfaces exposed, a brush having bristles extending radially therefrom mounted on said frame for rotation about an axis extending transversely of said separator plates adjacent the ends of the vanes remote from said separator plates to engage and brush across said filamentous surfaces on said vanes, and means drivingly connected between said vane driving means and said brush to impart rotary movement to the brush, means carried by said frame and operatively connected to said brush driving means for selectively adjusting the height of said brush above a ground surface.

4. In a machine for tripping blooms on growing plants comprising a frame adapted to be carried by an associated prime mover, separator plates secured to and depending from said frame and disposed substantially in planes which are uniformly spaced apart and parallel to each other and perpendicular to the plane of said frame, each of said plates having a substantially vertically disposed rear edge, vanes hingedly connected at their front ends to the rear edges of said separator plates and extending rearwardly one from each separator plate, power operated means mounted on said frame and drivingly connected to said vanes to impart to said vanes oscillating movements about the axes of the hinge connections between said vanes and the corresponding separator plates; the improvement residing in means for collecting and dispersing pollen from the tripped blooms, said means comprising a material having a filamentous surface carried by the outer surfaces of said vanes with the filamentous surfaces exposed, a brush having bristles extending radially therefrom mounted on said frame for rotation about an axis extending transversely of said separator plates adjacent the ends of the vanes remote from said separator plates to engage and brush across said filamentous surfaces on said vanes, and means drivingly connected between said vane driving means and said brush to impart rotary movement to the brush, and means carried by said frame at the end thereof remote from the associated prime mover for movement in parallel arcuate paths at opposite sides of the frame and operatively connected to said brush to selectively move the brush toward and away from said vanes, and means carried by said frame and operatively connected to said brush driving means for selectively adjusting the height of said brush above a ground surface.

References Cited in the file of this patent

UNITED STATES PATENTS

| | | |
|---|---|---|
| 1,866,219 | Nielsen | July 5, 1932 |
| 2,257,036 | Clark | Sept. 23, 1941 |
| 2,684,555 | Kantack | July 27, 1954 |
| 2,749,664 | Chepil | June 12, 1956 |